(12) United States Patent
Fawcett et al.

(10) Patent No.: US 9,439,245 B2
(45) Date of Patent: Sep. 6, 2016

(54) ELECTRICAL CONNECTOR FOR A LAMINATED WINDOW

(71) Applicant: Ford Global Technologies, LLC, Dearborn, MI (US)

(72) Inventors: Nigel Philip Harold Fawcett, London (GB); Tom Boettger, Dearborn, MI (US); Oliver Sterzenbach, Hurth (DE); Larry Agius, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 14/196,297

(22) Filed: Mar. 4, 2014

(65) Prior Publication Data

US 2014/0251975 A1 Sep. 11, 2014

(30) Foreign Application Priority Data

Mar. 7, 2013 (GB) .................................. 1304118.1
Jun. 4, 2013 (GB) .................................. 1309951.0

(51) Int. Cl.
*B60L 1/02* (2006.01)
*H05B 3/86* (2006.01)
*B32B 17/10* (2006.01)

(52) U.S. Cl.
CPC ........... *H05B 3/86* (2013.01); *B32B 17/10036* (2013.01); *B32B 17/10293* (2013.01); *B32B 17/10385* (2013.01); *B32B 17/10761* (2013.01); *H05B 2203/005* (2013.01); *H05B 2203/014* (2013.01); *H05B 2203/016* (2013.01); *Y10T 156/1064* (2015.01)

(58) Field of Classification Search
CPC .......... H05B 3/86; H05B 3/84; H05B 3/286; H05B 3/16; H05B 2203/016; H05B 2203/017; Y10T 56/1064; Y10T 29/49083; Y02B 30/26; B32B 17/10; B32B 17/10036; B32B 17/10174; B32B 17/10183; B32B 17/10302; B32B 17/10761; B32B 17/10376; B32B 17/10926; B32B 17/10293; B32B 17/10385; B32B 2637/00; F24D 13/002; F24D 13/024
See application file for complete search history.

(56) References Cited

FOREIGN PATENT DOCUMENTS

| EP | 0593940 A1 | | 4/1994 |
|---|---|---|---|
| GB | 971008 | | 9/1964 |
| WO | 2008047164 | * | 4/2008 |
| WO | 2008047164 A1 | | 4/2008 |
| WO | 2011131958 A1 | | 10/2011 |

* cited by examiner

*Primary Examiner* — Shawntina Fuqua
(74) *Attorney, Agent, or Firm* — Jason Rogers; Price Heneveld LLP (57) ABSTRACT

A laminated window is disclosed having a window heater unit which is connected to an external source of electrical power by means of an electrically conductive strip. At least a part of each of the electrically conductive strips is bonded on all sides to one or more laminating interlayer interposed between and bonding together two panes of glass. The bonding of the laminating interlayer to the electrically conductive strips during manufacture of the laminated window produces a water impervious seal between the laminating interlayer and the respective electrically conductive strip.

20 Claims, 6 Drawing Sheets

Fig.1

Prior Art

Fig.8

ELECTRICAL CONNECTOR FOR A LAMINATED WINDOW

FIELD OF THE INVENTION

The present invention generally relates to the provision of an electrical connector for a laminated window having an embedded electrical device and, in particular, to an improved electrical connector for a laminated heated windshield.

BACKGROUND OF THE INVENTION

It is known to produce a laminated glass window or windshield by bonding two layers or panes of shaped and annealed glass together with a plastic interlayer. The plastic interlayer is usually made from polyvinyl butyral (PVB) which is sandwiched between the glass panes. A typical laminated windshield comprises a 2 mm glass pane, a 0.4 mm plastic interlayer and a second 2 mm glass pane that are bonded together to produce a 4.4 mm thick laminated window such as a windshield.

As an alternative to the use of PVB it is also known to use as a plastic lamination material ethyl vinyl acetate (EVA) and thermoplastic polyurethane (TPU).

It is further known to embed a heater unit within the laminated glass structure to provide a means for heating the laminated windshield.

It is generally a problem with known motor vehicle heated laminated windshields that use embedded heater units that these sometimes fail in service through aqueous corrosion adjacent to and/or within a power supply busbar used to connect the heater unit to a source of electrical energy.

Figure 1:
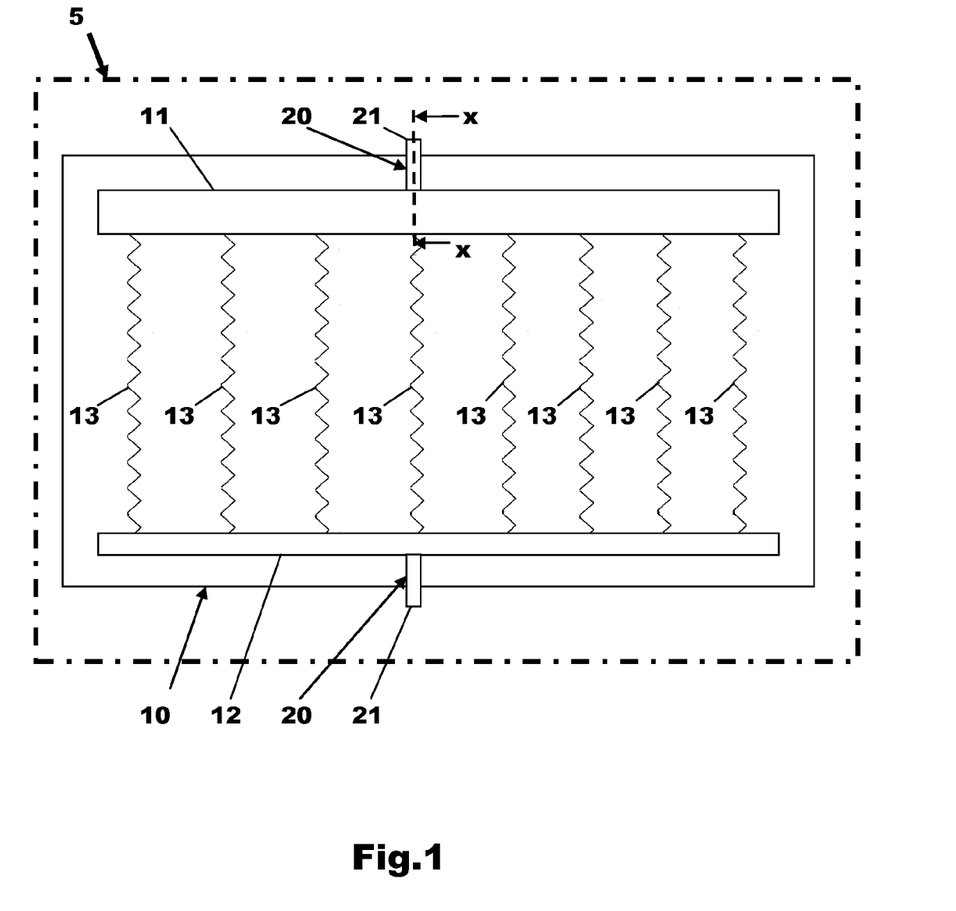
FIG. 1 is a schematic front view of a laminated heated windshield.
Figure 2:
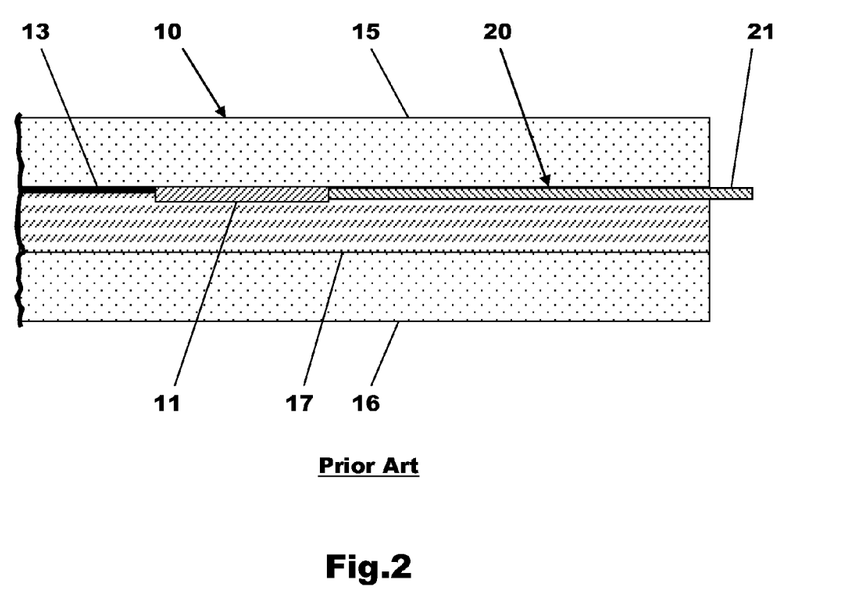
FIG. 2 is a schematic partial cross section on the line X-X on FIG. 1 showing a prior art electrical connection arrangement.

Analysis of such failed heaters has identified corrosion caused by water ingress along power supply ribbons used to connect the power busbars to a main electrical supply circuit of the motor vehicle to be a major factor. An example of a prior art arrangement is shown in FIGS. 1 and 2 and will be described in more detail hereinafter but essentially a leak path exists where water can enter the windshield and travel by capillary action along each power supply ribbon to the adjacent power busbar and then to the heater connected to that busbar.

It is known to solve this problem by placing adhesive tape so as to try and seal between the electrical supply ribbon and the glass but this is not particularly successful and is also a relatively time consuming process due to the need to accurately position the adhesive tape.

It would be desirable to provide an electrical connector for a laminated window having a water impervious seal. It would also be desirable to provide a method for producing a laminated window having an electrical connector with a water impervious seal.

SUMMARY OF THE INVENTION

According to a first aspect of the invention there is provided an electrical connector for a window having two panes of glass with at least one laminating interlayer interposed between and bonded to the two panes of glass and an electrical device interposed between the two panes of glass wherein the electrical connector comprises an electrically conductive strip for connecting one input of the electrical device to a source of electrical power wherein the electrically conductive strip is bonded on all sides to the at least one laminating interlayer to form a water impervious seal therebetween.

There may be a single laminating layer, the electrical device may be interposed between one of the two panes of glass and the laminating interlayer, the electrically conductive strip may have a first portion interposed between the one pane of glass, and the laminating interlayer for connection to the input of the electrical device and a second portion interposed between the other pane of glass and the laminating interlayer for connection to the source of electrical power. A third portion joining the first and second portions together and the third portion may extend through the laminating interlayer and is bonded to the laminating interlayer to form the water impervious seal.

According to further aspects, the third portion may extend through the laminating interlayer so as to be substantially normally arranged with respect to the two panes of glass. The third portion may be inclined with respect to the first and second portions to which it is joined so as to produce an internal angle greater than ninety degrees (90°) between it and the respective one of the first and second portions to which it is connected.

The third portion may have no electrical insulation thereon so as to reduce possible water leak paths between the second and first portions.

The laminating interlayer may have a slit formed therein prior to assembly and the second and third portions of the electrically conductive strip may be inserted through the slit in the plastic laminating interlayer.

Each of the second portions of the electrically conductive strip may have an end portion projecting out from a periphery of the window for connection to the source of electrical power.

Alternatively, there may be two laminating interlayers and the electrical device and the electrically conductive strip may be located between the two laminating interlayers and the electrically conductive strip may be bonded to both of the laminating interlayers so as to form the water impervious seal therebetween The electrical device may be a window heater. The window heater may comprise a number of heating wires. Alternatively, the window heater may comprise an electrothermal coating applied to one of the two panes of glass so as to be located between the one pane of glass and the laminating interlayer. The coating may be applied by one of physical vapor deposition and chemical vapor deposition. As yet another alternative the window heater may comprise a conductive film.

The electrically conductive strip may comprise a busbar having a first portion interposed between the one pane of glass and the laminating interlayer for connection to the window heater and a second portion interposed between the other pane of glass and the laminating interlayer for connection to the source of electrical power and a third portion joining the first and second portions together wherein the third portion extends through the laminating interlayer and forms a seal between the busbar and the laminating interlayer.

Alternatively, the electrically conductive strip may comprise a busbar connected to one input of the electrical device and a ribbon connector electrically and mechanically connected to the busbar for connecting the busbar to the source of electrical power and the ribbon connector may have a first portion interposed between the one pane of glass and the laminating interlayer for connection to the busbar, a second portion interposed between the other pane of glass and the laminating interlayer for connection to the source of electrical power and a third portion joining the first and second portions together wherein the third portion may extend through the laminating interlayer so as to form a seal between the ribbon connector and the laminating interlayer.

According to a second aspect of the invention there is provided an electrically heated window comprising two panes of glass with a laminating interlayer interposed between and bonded to the two panes of glass and an electrical device in the form of a window heater interposed between one of the two panes of glass and the laminating interlayer and an electrical connector constructed in accordance with the first aspect of the invention for connecting one input of the window heater to a source of electrical power.

The window may further include a second electrical connector constructed in accordance with the first aspect of the invention for connecting a second input of the window heater to the source of electrical power.

Each of the first and second electrical connectors may have an end portion projecting out from a periphery of the electrically heated window for connection to the source of electrical power. The two end portions may be located adjacent to one another but on opposite sides of the laminating interlayer. The window may have two window heaters arranged in a side-by-side relationship.

According to a third aspect of the invention there is provided a motor vehicle having an electrically heated window constructed in accordance with the second aspect of the invention.

According to a fourth aspect of the invention there is provided a method of manufacturing a laminated window wherein the method comprises producing a pair of matching window panes, producing a laminating interlayer, cutting the laminating interlayer in predefined positions to produce slits therein, threading an electrically conductive strip through a respective slit in the laminating interlayer so that a first portion of the electrically conductive strip is positioned on one side of the laminating interlayer and a second portion of the electrically conductive strip is positioned on an opposite side of the laminating interlayer and a third portion of the electrically conductive strip passes through the respective slit and bonding with heat the two panes together to produce the laminated window and to form a water impervious seal between the third portion of electrically conductive strip and the laminating interlayer.

The electrical device may be a window heater and the laminated window may be an electrically heated laminated window.

Bonding the two panes together may include removing air from between the two panes and the plastic laminating interlayer.

Bonding the two panes together may include applying heat to bond the two panes together using the laminating layer.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5b is a cross section along the line Y-Y on FIG. 5a;

FIG. 6b is an end view in the direction of arrow E on FIG. 6a;

DETAILED DESCRIPTION OF THE PREFERRED EMBODIMENTS

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Referring now to FIGS. 1 and 2 there is shown a laminated window in the form of an electrically heated windshield 10 for a motor vehicle 5.

The electrically heated windshield 10 includes two panes of glass 15, 16 having a plastic laminating interlayer 17 such as a PVB interlayer interposed between and bonded to the two panes 15, 16.

An electrical device in the form of a window heater comprises of a number of heating wires 13 interposed between a first one 15 of the two panes of glass 15, 16 and the plastic laminating interlayer 17. Each of the heating wires 13 may be a tungsten filament and is typically 10 to 50 μm thick, according to one embodiment.

Each wire 13 has a first input at one end connected to a first common busbar 11 and a second input at an opposite end connected to a second common busbar 12.

Electrically conductive ribbons 20 are used to provide an electrical connection between the two busbars 11, 12 and an external source of electrical power (not shown) such as, for example, a power supply circuit of a motor vehicle.

As best seen in FIG. 2, the heating wires 13, busbars 11, 12 and electrically conductive ribbons 20 are all located between the first pane of glass 15 and the plastic laminating interlayer 17.

Although the plastic laminating interlayer 17 is able to bond with and form a seal between one face of the electrically conductive ribbon 20 there is a water leak path between the electrically conductive ribbon 20 and the first pane of glass 15.

As previously mentioned, this leak path allows water to migrate via capillary action from an outer periphery of the laminated windshield 10 to the adjacent ends of the heating wires thereby promoting aqueous corrosion of the heating wires 13. Such corrosion can result in failure or deterioration of the connection between the heating wires 13 and the busbars 11, 12 and so is a problem with such a prior art design.

Figure 3:
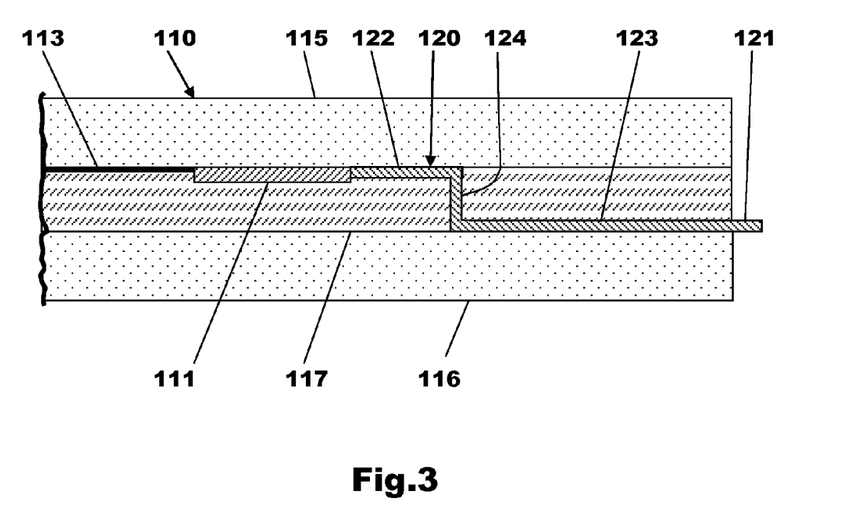
FIG. 3 is a schematic partial cross section similar to FIG. 2 but showing a first embodiment of an electrical connection arrangement according to a first embodiment.

FIG. 3 shows a first embodiment of an electrical connection for an electrically heated laminated windshield of the type shown in FIG. 1 that overcomes the aforesaid leakage and corrosion problems.

The electrically heated windshield 110 comprises first and second panes of glass 115, 116 having a plastic laminating interlayer 117 such as a PVB interlayer interposed between and bonded to the two panes of glass 115, 116.

An electrical device in the form of a window heater comprised of a number of heating wires 113 is interposed between the first pane of glass 115 and the plastic laminating interlayer 117.

Each wire 113 has a first input at one end connected to a first common busbar 111 (located as per the busbar 11 on FIG. 1) and a second input at an opposite end connected to a second common busbar 112 (not shown but located as per busbar 12 on FIG. 1).

Electrically conductive strips in the form of first and second ribbons 120 (positioned as per the ribbons 20 on FIG. 1) are used to provide an electrical connection between the two busbars 111, 112 and an external source of electrical power (not shown) such as for example a power supply circuit of a motor vehicle.

Both of the ribbons 120 has a first portion 122 interposed between the first pane of glass 115 and the plastic laminating interlayer 117 for connection via a respective one of the first and second busbars 111, 112 to the heating wires 113 and a second portion 123 interposed between the second pane of glass 116 and the plastic laminating interlayer 117 for connection to the source of electrical power. The ribbons 120 also include a third portion 124 joining the first and second portions 122, 123 together. It will be appreciated that each of the ribbons 120 is formed from a single piece of conductive material such as, for example, a thin copper or aluminum strip and the use of the terms first, second and third portions is merely to aid understanding of the invention.

The third portion 124 of the each electrically conductive ribbon 120 extends through the laminating interlayer 117 and forms a seal between all surfaces/sides of the electrically conductive ribbon 120 and the plastic laminating interlayer 117.

In the case of this embodiment each third portion 124 extends through the plastic laminating interlayer 117 so as to be arranged substantially normal with respect to the first and second panes of glass 115 and 116.

With a prior art connector arrangement, such as that shown in FIG. 2, the connector ribbons 20 are usually covered with polymer electrical insulation. This insulation normally ends within the windshield before the electrical connection with the busbar 11. In the case of the embodiment shown in FIG. 3, polymer insulation may also be used on the ribbons 120 but in this case the polymer insulation ends before region 124, that is to say, only the second portion 123 of each ribbon 120 has a polymer coating.

This has the advantage of minimizing the number of interfaces that may fail and admit water through capillary action. That is to say, by using no electrical insulation on the third portion 124 of each ribbon 120, the number of possible leak paths between the second and first portions 123 and 122 is reduced. In addition, bonding of the PVB to the ribbon 120 may be increased if no coating or polymer insulation is provided on the ribbon.

To permit the passage of the third portions 124 through the plastic laminating interlayer 117, the plastic laminating interlayer 117 has slits formed in it prior to assembly of the laminated windshield 110.

During assembly the second portions 123 and the third portions 124 are inserted through a respective slit so that each third portion 124 of the electrically conductive ribbons 120 extends through a respective slit in the plastic laminating interlayer 117. Upon the subsequent application of heat and pressure during assembly of the laminated windshield 110 the plastic laminating interlayer 117 bonds and provides a water impervious seal between both sides of each third portion 124.

Although a water path is still present between the second portion 123 of each electrically conducting ribbon 120 and the second pane of glass 116, water is not able to traverse the third portion 124 because it is sealed to the plastic laminating interlayer 117.

The second portion 123 of each electrically conductive ribbon 120 has an end portion 121 projecting out from a periphery of the electrically heated laminated windshield 110 for connection to the source of electrical power.

Figure 4:
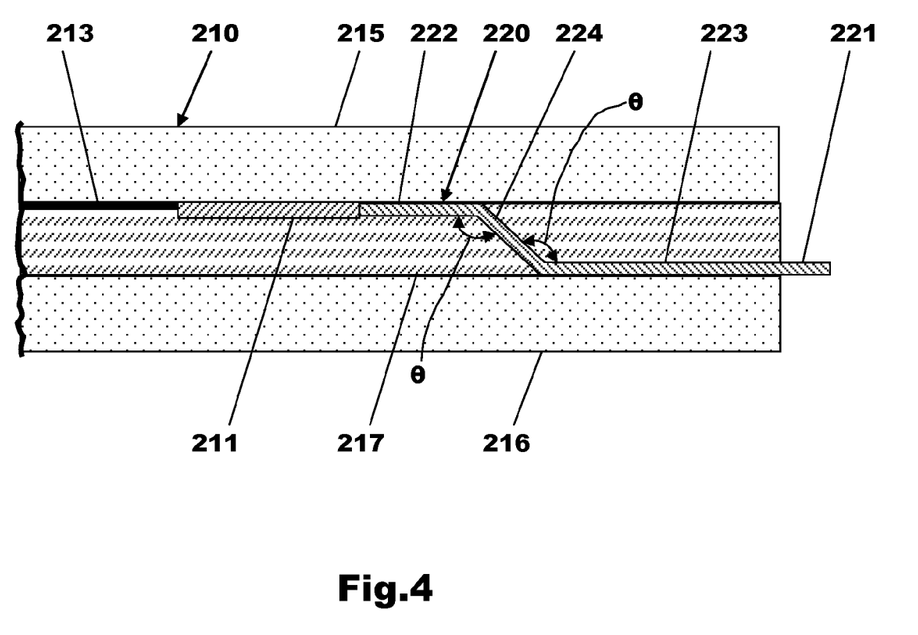
FIG. 4 is a schematic partial cross section similar to FIG. 2 but showing a second embodiment of an electrical connection arrangement.

FIG. 4 shows a second embodiment of an electrical connection for a heated laminated windshield of the type shown in FIG. 1 that overcomes the aforesaid corrosion problem.

The electrically heated laminated windshield 210 comprises first and second panes of glass 215, 216 having a plastic laminating interlayer 217 such as a PVB interlayer interposed between and bonded to the two panes of glass 215, 216.

As before, an electrical device in the form of a window heater comprises a number of heating wires 213 interposed between the first pane of glass 215 and the plastic laminating interlayer 217.

Each of the heater wires 213 has a first input at one end connected to a first common busbar 211 (located as per the busbar 11 on FIG. 1) and a second input located at an opposite end connected to a second common busbar 212 (not shown but located as per busbar 12 on FIG. 1).

A pair of electrically conductive strips in the form of first and second ribbons 220 (located as per the ribbons 20 on FIG. 1) are used to provide an electrical connection between the two busbars 211, 212 and an external source of electrical power (not shown) such as for example a power supply circuit of a motor vehicle.

Both of the ribbons 220 has a first portion 222 interposed between said first pane of glass 215 and the plastic laminating interlayer 217 for connection via a respective one of the first and second busbars 211, 212 to the heating wires 213 and a second portion 223 interposed between the second pane of glass 216 and the plastic laminating interlayer 217 for connection to the source of electrical power. The ribbons 220 also include a third portion 224 joining the first and second portions 222, 223 together. It will be appreciated that each of the ribbons 220 is formed from a single piece of conductive material such as, for example, a thin copper or aluminum strip and the use of the terms first, second and third portions is merely to aid understanding of the invention.

The third portion 224 of the each conductive ribbon 220 extends through the laminating interlayer 217 and forms a seal between all surface/sides of the electrically conductive ribbon 220 and the plastic laminating interlayer 217.

In this embodiment each third portion 224 is inclined with respect to the first and second portions 222, 223 to which it is joined so as to produce an internal angle ($\theta$) greater than ninety degrees (90°) between the third portion 224 and the respective one of the first and second portions 222, 223 to which it is connected. That is to say, the third portions 224 are inclined with respect to the plastic laminating interlayer 217 which enables the second and third portions 223 and 224 to be threaded more easily through the slits in the plastic laminating layer 217 during assembly.

As previously mentioned, with a prior art connector arrangement such as that shown in FIG. 2, the connector ribbons 20 are usually covered with polymer insulation. This insulation normally ends within the windshield before the electrical connection with the busbar 11. In the case of the embodiment shown in FIG. 4, polymer insulation may also be used on each ribbon 220 but in this case the polymer insulation ends before region 224. That is to say, only the second portion 223 of each ribbon 220 has a polymer coating. This has the advantage that the number of interfaces that may fail and admit water through capillary action is reduced.

In the case of one exemplary embodiment the first and third portions 222 and 224 are formed from tinned copper and the seal comprised of PVB/tinned copper/PVB.

To permit the passage of the third portions 224 through the plastic laminating interlayer 217, the plastic laminating interlayer 217 has slits formed in it prior to assembly of the laminated windshield 210.

Each third portion 224 of the electrically conductive ribbons 220 extends through a respective angled slit in the plastic laminating interlayer 217 and upon the application of heat and pressure during assembly of the laminated windshield 210 the plastic laminating interlayer 217 bonds and provides a water impervious seal between itself and each third portion 224.

The use of a third portion 224 that is inclined with respect to the first and second portions 222, 223 to which it is joined so as to produce an internal angle (θ) greater than ninety degrees (90°) between the third portion 224 and the respective one of the first and second portions 222, 223 to which it is connected has the advantage that it is easier to insert the electrically conductive ribbon 220 through the angled slit. Secondly, the length of plastic laminating layer 217 that is bonded and sealed to the third portion 224 is greater than is the case if the third portion 224 is normally arranged to the plastic laminating interlayer 217 as is the case with the first embodiment.

Although a water path is still present between the second portion 223 of each electrically conducting ribbon 220 and the second pane of glass 216, water is not able to traverse the third portion 224 because it is sealed to the plastic laminating interlayer 217.

Each second portion 223 of the electrically conductive ribbons 220 has an end portion 221 projecting out from a periphery of the electrically heated window 210 for connection to the source of electrical power.

Although the invention has thus far been described with respect to a window heater formed from a number of heater wires it will be appreciated that the invention is not limited to such an arrangement and that the window heater could be formed from other electro-thermal devices. That is to say, the window heater could be any suitable device that produces heat when an electrical current is passed through it. For example, the window heater may comprise an electro-thermal coating applied to one of the two panes of glass so as to be located between said one pane of glass and the laminating interlayer. The coating could be applied by physical vapor deposition or chemical vapor deposition. As yet another alternative, the window heater could comprise a conductive film interposed between one of the panes of glass and the laminating interlayer.

Figure 5A:
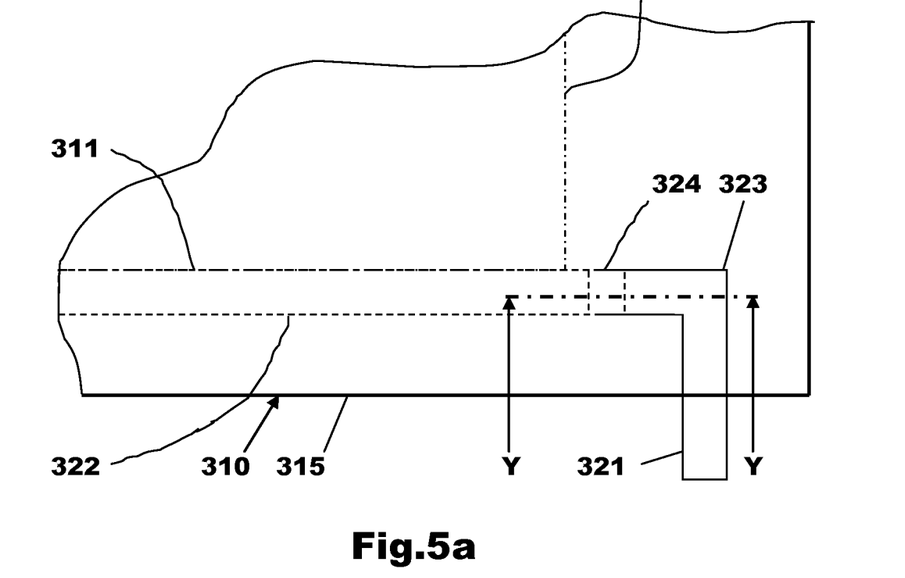
FIG. 5a is a plan view showing part of an electrical connector according to a third embodiment.
Figure 5B:
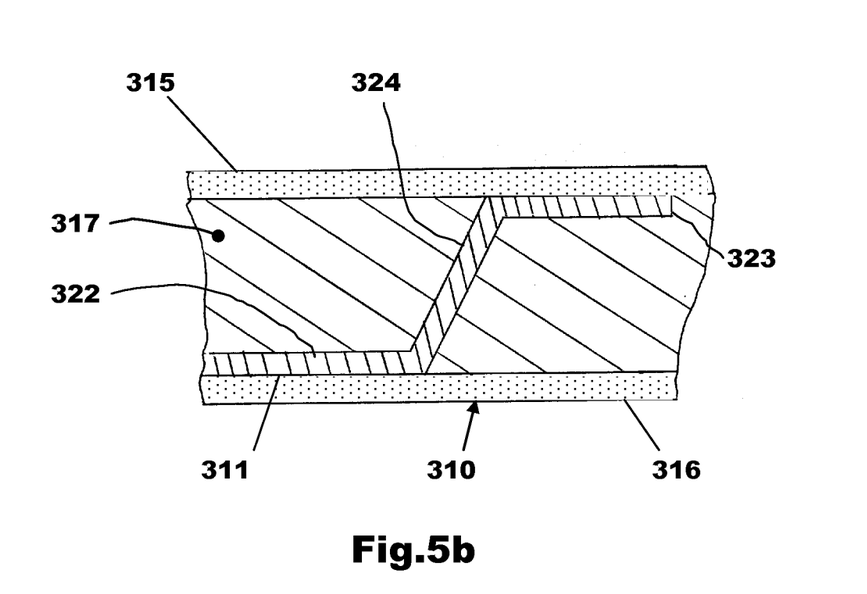

With specific reference to FIGS. 5a and 5b there is shown a third embodiment of an electrical connector for a laminated window. In the embodiments previously described the electrically conductive strips used to connect a window heater to a source of electrical power are in the form of electrically conductive ribbons which are sealed within the PVB so as to prevent the ingress of water to the window heater. In the case of this third embodiment the electrically conductive strips are formed by the busbars used to connect inputs to the window heater to the source of electrical power.

The electrically heated laminated windshield 310 comprises first and second panes of glass 315, 316 having a plastic laminating interlayer 317 such as a PVB interlayer interposed between and bonded to the two panes of glass 315, 316.

A window heater 313 which may be of any suitable type is interposed between the first pane of glass 315 and the PVB layer 317. The window heater 313 is attached along one edge to an electrically conductive strip in the form of a first busbar 311 to form a first input and is attached along a second opposite edge to an electrically conductive strip in the form of a second busbar (not shown) to form a second input. The second busbar is constructed in the same manner as the first busbar 311 hereinafter described in more detail.

The first busbar 311 has a first portion 322, a second portion 323 and a third portion 324. The second portion 323 includes an end portion 321 that extends out from a peripheral edge of the laminated windshield 310. The end portion 321 could be attached to a conductive ribbon which extends out from the peripheral edge for connection to the source of electrical power.

The first portion 322 is interposed between the first pane of glass 315 and the plastic laminating interlayer 317, the second portion 323 is interposed between the second pane of glass 316 and the plastic laminating interlayer 317 for connection to the source of electrical power and the third portion 324 joins the first and second portions 322 and 323 together and extends through the plastic laminating layer 317. It will be appreciated that the busbar 311 is formed from a single piece of conductive material such as, for example, a thin copper or aluminum strip and the use of the terms first, second and third portions is merely to aid understanding of the invention.

The third portion 324 of the busbar 311 extends through the laminating interlayer 317 and is bonded to the laminating interlayer so as to form a water impervious seal between the busbar 311 and the plastic laminating interlayer 317.

In this embodiment, the third portion 324 of the busbar 311 is inclined with respect to the first and second portions 322, 323 of the busbar 311 to which it is joined so as to produce an internal angle greater than ninety degrees (90°) between the third portion 324 and the respective one of the first and second portions 322, 323 to which it is connected. However, the third portion 324 could be arranged normal to the two panes of glass 315, 316. The use of an inclined third portion 324 enables the second and third portions 323 and 324 to be threaded more easily through the slits in the plastic laminating layer 317 during assembly.

During assembly of the windscreen 310, heating of the plastic laminating layer 317 used to bond it to the two panes of glass 315, 316 also causes the plastic laminating layer 317 to bond to both sides of the third portion 324. This forms a water impervious seal between the plastic laminating layer 317 and the third portion 324 and prevents, in use, water from reaching the first portion 322 of the first busbar 311 and, in particular, the window heater 313.

Figure 6A:
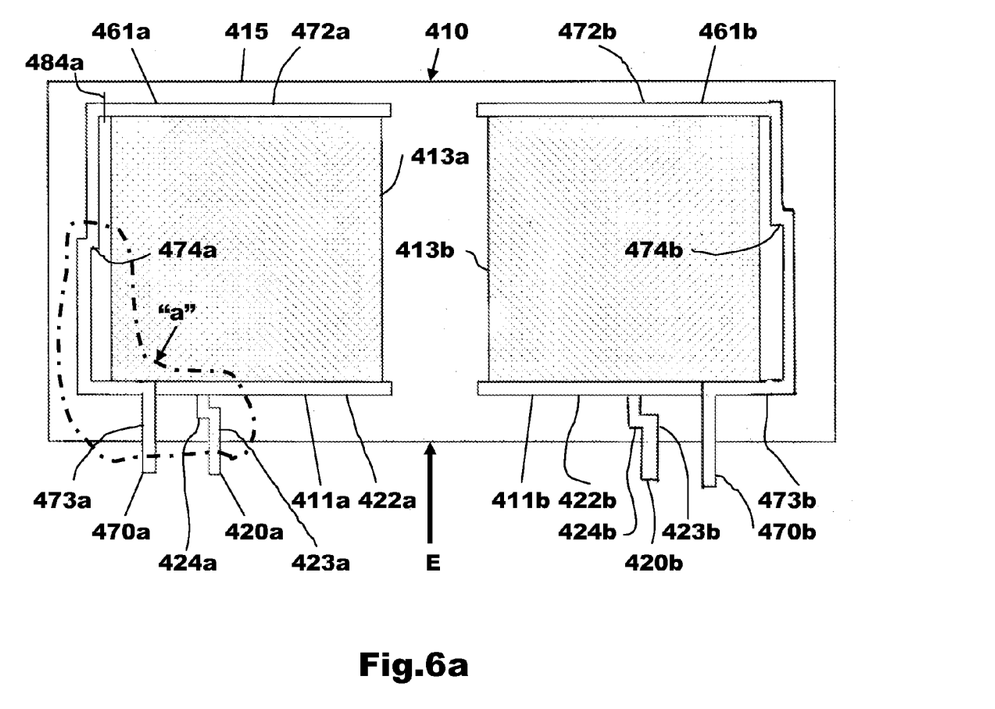
FIG. 6a is a plan view of a laminated windshield according to a second aspect of the invention having electrical connectors according to a fourth embodiment.
Figure 6B:
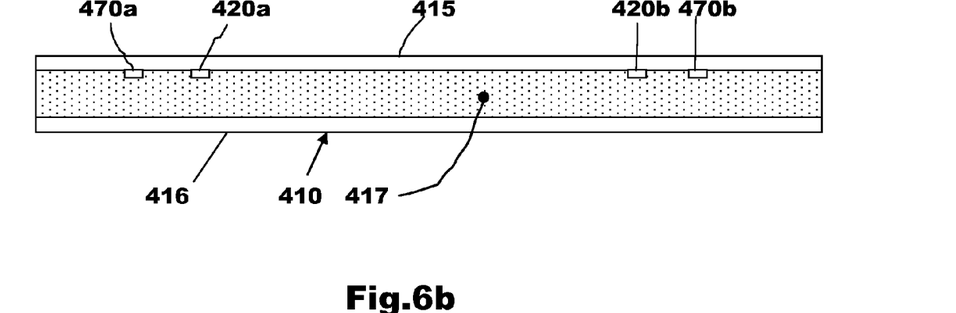
Figure 7:
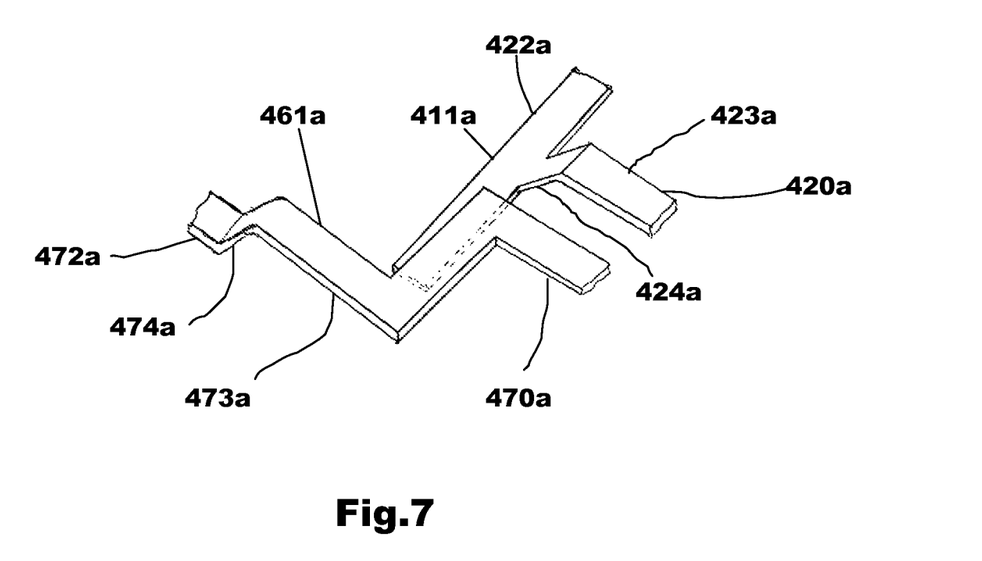
FIG. 7 is a pictorial view of the region "a" on FIG. 6a showing only the electrical connectors.

With particular reference to FIGS. 6a to 7 there is shown a heated windshield 410 for a motor vehicle having two separate window heaters 413a, 413b. Each of the two window heaters 413a, 413b can be of any suitable construction and is not limited to an arrangement using multiple heater wires.

The electrically heated laminated windshield 410 comprises first and second panes of glass 415, 416 having a plastic laminating interlayer 417 such as a PVB interlayer interposed between and bonded to the two panes of glass 415, 416.

The window heaters 413a, 413b are both interposed between the second pane of glass 416 and the PVB layer 417.

The first window heater 413a is attached along a lower edge to an electrically conductive strip in the form of a first busbar 411a to form a first input and is attached along a second upper edge to an electrically conductive strip in the form of a second busbar 461a to form a second input to the window heater 413a.

The first busbar 411a has a first portion 422a, a second portion 423a and a third portion 424a. The second portion 423a has an end portion 420a that extends out from a lower peripheral edge of the laminated windshield 410. The first portion 422a is interposed between the second pane of glass 416 and the plastic laminating interlayer 417, the second portion 423a is interposed between the first pane of glass 415 and the plastic laminating interlayer 417 for connection to a source of electrical power (not shown) and the third portion 424a joins the first and second portions 422a and 423a together and extends through the plastic laminating layer 417. It will be appreciated that the busbar 411a is formed from a single piece of conductive material such as, for example, a thin copper or aluminum strip and the use of the terms first, second and third portions is merely to aid understanding of the invention.

The third portion 424a of the busbar 411a extends through the laminating interlayer 417 and forms a seal between the busbar 411a and the plastic laminating interlayer 417. It will be appreciated that the laminating layer 417 is bonded to all surfaces of the third portion 424a.

In this embodiment the third portion 424a of the busbar 411a is inclined with respect to the first and second portions 422a, 423a of the busbar 411a to which it is joined so as to produce an internal angle greater than 90 degrees between the third portion 424a and the respective one of the first and second portions 422a, 423a to which it is connected. However, the third portion 424a could be arranged normal to the two panes of glass 415, 416. The use of an inclined third portion 424a enables the second and third portions 423a and 424a or the first and third portions 423a and 424a to be threaded more easily through the respective slit in the plastic laminating layer 417 during assembly.

During assembly of the windscreen 410, heating of the plastic laminating layer 417 used to bond it to the two panes of glass 415, 416 also causes the plastic laminating layer 417 to bond to both sides of the third portion 424a. This forms a water impervious seal between the plastic laminating layer 417 and the third portion 424a and prevents, in use, water from reaching the first portion 422a of the first busbar 411a and, in particular, the window heater 413a.

The second busbar 461a has a first portion 472a, a second portion 473a and a third portion 474a. The second portion 473a includes an end portion 470a that extends out from a lower peripheral edge of the laminated windshield 410. The first portion 472a is interposed between the second pane of glass 416 and the plastic laminating interlayer 417, the second portion 473a is interposed between the first pane of glass 415 and the plastic laminating interlayer 417 for connection to the source of electrical power and the third portion 474a joins the first and second portions 472a and 473a together and extends through the plastic laminating layer 417. It will be appreciated that the busbar 461a is formed from a single piece of conductive material such as, for example, a thin copper or aluminum strip and the use of the terms first, second and third portions is merely to aid understanding of the invention.

The third portion 474a of the busbar 461a extends through the laminating interlayer 417 and forms a water impermeable seal between the busbar 461a and the plastic laminating interlayer 417. It will be appreciated that the laminating layer 417 is bonded to all surfaces of the third portion 424a.

In this embodiment the third portion 474a of the busbar 461a is inclined with respect to the first and second portions 472a, 473a of the busbar 461a to which it is joined so as to produce an internal angle greater than 90 degrees between the third portion 474a and the respective one of the first and second portions 472a, 473a to which it is connected. However, the third portion 474a could be arranged normal to the two panes of glass 415, 416. The use of an inclined third portion 474a enables the second and third portions 473a and 474a to be threaded more easily through the slits in the plastic laminating layer 417 during assembly.

During assembly, heating of the plastic laminating layer 417 causes it to bond to both sides of the third portion 474a and thereby form a water impervious seal preventing water from reaching the first portion 472a of the first busbar 461a and, in particular, the window heater 413a.

The two end portions 420a, 470a are located adjacent to one another and both extend from a lower edge of the laminated windshield 410 so as to enable them to be conveniently connected to the source of electrical power. It will be appreciated that it is easier and requires a shorter electrical connection to the main electrical circuits of the motor vehicle if the connection can be made at a lower edge of the windscreen 410 by connectors that are positioned in close proximity.

In order to achieve the arrangement shown in FIGS. 6a and 6b the position of the third portion 474a of the second busbar 461a has to be spaced away from the first busbar 411a so that portions of the first and second busbars 411a and 461a are not on the same side of the plastic laminating interlayer 417 in regions where they overlap. It will also be appreciated that the spacing of the third portion 474a from the first busbar 411a has to be sufficient to prevent electrical short circuits from occurring.

The position of the third portion 474a could for example be changed from that shown in FIG. 6a and could for example be at the position indicated by the line 484a on FIG. 6a.

The second window heater 413b is attached along a lower edge to a first busbar 411b to form a first input and is attached along a second upper edge to a second busbar 461b to form a second input to the window heater 413b. The construction and arrangement of the two busbars 411b, 461b is the same as that previously described with respect to the busbars 411a, 461a with like parts accorded the suffix 'b' instead of 'a.'

Figure 8:
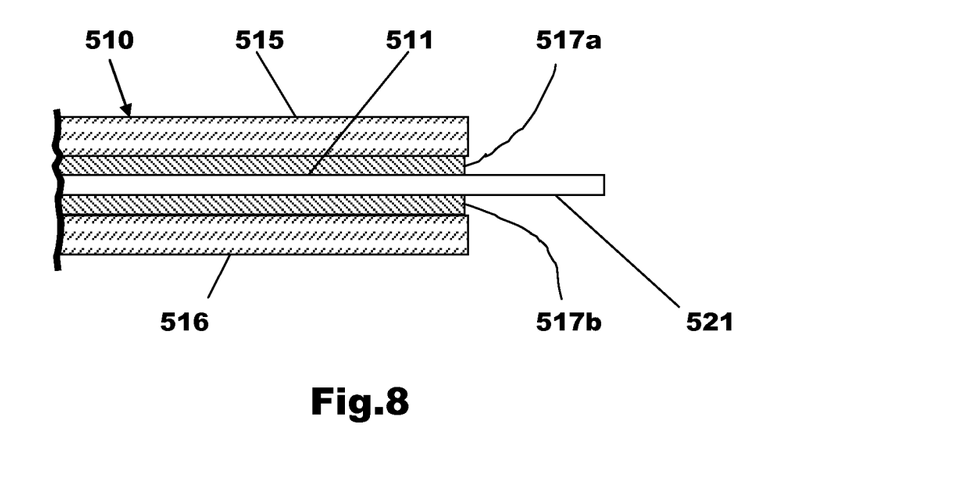
FIG. 8 is a schematic cross section through part of a laminated window according to a second aspect of the invention having electrical connectors according to a fifth embodiment.

As an alternative to the above embodiments, all of which use a single PVB laminating interlayer, FIG. 8 shows an alternative construction in which two PVB laminating layers 517a, 517b are used between two panes of glass 515, 516. With such a twin interlayer construction the electrical device (not shown) which may be in the form of a window heater is interposed between the two laminating interlayers 517a, 517b along with two electrically conductive strips 511 (only one of which is shown) used to connect the electrical device to a source of electrical power (not shown). As before end portions 521 of the electrically conductive strips 511 extend out from a peripheral edge of the window 510 so as to enable them to be connected to the source of electrical power. When heat is applied to bond the two panes of glass 515, 516 together during assembly of the window 510, the two laminating interlayers 517a, 517b bond the two panes of glass 515, 516 together and also bond to all sides of the electrically conductive strips 511 so as to form a water impervious seal therebetween. Water is therefore unable to leak or penetrate to cause damage to the electrical device or cause internal corrosion of the electrically conductive strips 511.

Each of the laminating layers could be between 0.25 and 0.5 mm in thickness.

Therefore in summary, corrosion of an electrical device such as a window heater for a heated laminated windshield can be eliminated by using a electrical connection arrangement constructed in accordance with this invention.

One embodiment of a method of manufacturing a laminated electrically heated window constructed in accordance with one embodiment comprises producing a pair of matching windowpanes, independently producing a laminating interlayer and cutting the laminating interlayer in predefined positions to produce slits therein.

An electrically conductive strip is threaded through a respective slit in the laminating interlayer so that a first portion of the electrically conductive strip is positioned on one side of the laminating interlayer, a second portion of the electrically conductive strip is positioned on an opposite side of the laminating interlayer and a third portion of the electrically conductive strip passes through the respective slit.

The first portion of the electrically conductive strip is connected to an input to an electrical device such as a window heater located on the same side of the laminating layer as the first portion of the electrically conductive strip.

The method further comprises bonding the two panes together with heat to form the laminated window. The bonding process causes the laminating layer to bond to the third portion of the electrically conductive strip so as to form a seal between the third portion of the electrically conductive strip and the laminating interlayer.

It will be appreciated that alternative methods of producing a heated laminated windshield could be used and that the invention is not limited to the exact process described herein.

Similarly, the location, size and shape of the busbars need not be as shown and/or the shape and location of the electrical ribbons need not be as shown and the embodiments provided are only examples provided for improving understanding of the invention.

Furthermore, although the invention has been described to a particularly advantageous use in respect of an electrical device in the form of a window heater it will be appreciated that it could be applied to other thin embedded electrical devices such as, for example and without limitation, an antenna for receiving or transmitting a signal and an electrochromic device.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

What is claimed is:

1. An electrical connector for a window having two panes of glass with at least one laminating interlayer interposed between and bonded to the two panes of glass and an electrical device interposed between the two panes of glass, wherein the electrical connector comprises an electrically conductive strip for connecting one input of the electrical device to a source of electrical power, wherein the electrically conductive strip is bonded on all sides to the at least one laminating interlayer to form a water impervious seal therebetween, and wherein the electrically conductive strip has a first portion interposed between said one pane of glass and the laminating interlayer for connection to the electrical device and a second portion interposed between the other pane of glass and the laminating interlayer for connection to the source of electrical power, and a third portion joining the first and second portions together, wherein the third portion extends through the laminating interlayer and is bonded to the laminating interlayer to form the water impervious seal, and wherein the first portion of the electrically conductive strip terminates in contact with said one pane of glass at a location between said one pane of glass and the laminating interlayer.

2. The electrical connector as claimed in claim 1, wherein there is a single laminating interlayer, the electrical device is interposed between one of the two panes of glass and the laminating interlayer.

3. The connector as claimed in claim 1, wherein the third portion extends through the laminating interlayer so as to be substantially normally arranged with respect to the two panes of glass.

4. The connector as claimed in claim 1, wherein the third portion is inclined with respect to the first and second portions to which it is joined so as to produce an internal angle greater than ninety degrees (90°) between it and the respective one of the first and second portions to which it is connected.

5. The connector as claimed in claim 1, wherein the third portion has no electrical insulation thereon so as to reduce possible water leak paths between the second and first portions.

6. The connector as claimed in claim 1, wherein each of the second portions of the electrically conductive strip has an end portion projecting out from a periphery of the window for connection to the source of electrical power.

7. The connector as claimed in claim 1, wherein there are two laminating interlayers and the electrical device and the electrically conductive strip are located between the two laminating interlayers and the electrically conductive strip is bonded to both of the two laminating interlayers so as to form the water impervious seal therebetween.

8. The connector as claimed in claim 1, wherein the electrical device is a window heater.

9. An electrically heated window comprising two panes of glass with at least one laminating interlayer interposed between the two panes of glass, an electrical device in the form of a window heater interposed between the two panes of glass and an electrical connector as claimed in claim 1 for connecting one input of the window heater to a source of electrical power.

10. The window as claimed in claim 9, wherein the window further comprises a second electrical connector for connecting a second input of the window heater to the source of electrical power.

11. The window as claimed in claim 10, wherein each of the first and second electrical connectors has an end portion projecting out from a periphery of the electrically heated window for connection to the source of electrical power, and wherein the end portion of the first and second connectors are located adjacent to one another but on opposite sides of the laminating interlayer.

12. A method of manufacturing a laminated window, wherein the method comprises:
   producing a pair of matching window panes;
   producing a laminating interlayer,
   cutting the laminating interlayer in predefined positions to produce slits therein;
   threading an electrically conductive strip through a respective slit in the laminating interlayer so that a first portion of the electrically conductive strip is positioned and terminates in contact with one of the window panes on one side of the laminating interlayer and a second portion of the electrically conductive strip is positioned on an opposite side of the laminating interlayer and a third portion of the electrically conductive strip passes through the respective slit; and
   bonding with heat the two panes together to produce the laminated window and to form a water impervious seal between the third portion of electrically conductive strip and the laminating interlayer.

13. The method as claimed in claim 12, wherein the electrical device is a window heater and the laminated window is an electrically heated laminated window.

14. An electrically heated window comprising:
   a first glass pane;
   a second glass pane;
   a laminating interlayer interposed between and bonded to the first and second glass panes;
   at least one heating wire interposed between the first and second glass panes; and
   an electrically conductive strip coupled to an electrical power source and bonded on all sides to the laminating interlayer to form a water impervious seal therebetween, the electrically conductive strip in contact with the first and second glass panes and extending between the first and second glass panes and terminating in contact with the first glass pane at a location between the first, glass pane and the interlayer.

15. The electrically heated window as claimed in claim 14, wherein said electrically conductive strip comprises a first portion interposed between said first glass pane and the laminating interlayer and coupled to the at least one heating wire, a second portion interposed between the second glass pane and the laminating interlayer and coupled to the electrical power source, and a third portion joining the first and second portions together, wherein the third portion extends through the laminating interlayer and forms a seal between both sides of the electrically conductive ribbon and the laminating interlayer.

16. The electrically heated window as claimed in claim 15, wherein the laminating interlayer has a slit formed therein prior to assembly and the third portion of the electrically conductive ribbon extends through the slit in the plastic laminating interlayer.

17. The electrically heated window as claimed in claim 16, wherein the at least one heating wire is connected at one end to a common bus bar interposed between the first pane of glass and the laminating interlayer and the first portion of the electrically conductive ribbon is electrically connected to the common bus bar.

18. The electrically heated window as claimed in claim 14, wherein the third portion extends through the laminating interlayer so as to be substantially normally arranged with respect thereto.

19. The electrically heated window as claimed in claim 14, wherein the third portion is inclined with respect to the first and second portions to which it is joined so as to produce an internal angle greater than 90 degrees between it and the respective one of the first and second portions to which it is connected.

20. The electrically heated window as claimed in claim 14, wherein the window is located on a motor vehicle.

* * * * *